(12) United States Patent
Li et al.

(10) Patent No.: US 9,275,212 B2
(45) Date of Patent: Mar. 1, 2016

(54) SECURE ELEMENT BIOMETRIC AUTHENTICATION SYSTEM

(71) Applicant: Cellco Partnership, Arlington, VA (US)

(72) Inventors: Yuk Lun Li, Morganville, NJ (US); Praveen Venkataramu, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 112 days.

(21) Appl. No.: 13/727,065

(22) Filed: Dec. 26, 2012

(65) Prior Publication Data

US 2014/0181959 A1 Jun. 26, 2014

(51) Int. Cl.
G06F 21/32 (2013.01)

(52) U.S. Cl.
CPC .................................... *G06F 21/32* (2013.01)

(58) Field of Classification Search
None
See application file for complete search history.

(56) References Cited

U.S. PATENT DOCUMENTS

| 6,325,285 | B1 * | 12/2001 | Baratelli | 235/380 |
| 2004/0193893 | A1 * | 9/2004 | Braithwaite et al. | 713/186 |
| 2006/0222210 | A1 * | 10/2006 | Sundaram | 382/115 |
| 2010/0162386 | A1 * | 6/2010 | Li et al. | 726/19 |

* cited by examiner

*Primary Examiner* — Aravind Moorthy
*Assistant Examiner* — Simon Kanaan

(57) ABSTRACT

An input device may be in communication with an application processor, wherein the input device may be configured to receive an input and the application processor may be configured to translate the input to a received template. A secure element may be in communication with the application processor and configured to receive the received template from the application processor. The secure element may include a matcher and an enrolled template database. The matcher may be configured to compare the received template from the application processor with an enrolled template within the enrolled template database and return a match status based on the comparison.

22 Claims, 4 Drawing Sheets

SECURE ELEMENT BIOMETRIC AUTHENTICATION SYSTEM

BACKGROUND INFORMATION

Biometric authentication has been shown to represent an accurate form of authentication for individuals. Biometric authentication offers advantages over the traditional knowledge-based identification systems such as passwords or personal identification numbers. Biometric authentication may be used as a form of identification and access control for electronic devices such as cell phones, tablet computers, etc. However, systems utilizing biometric authentication are still subject to potential security breaches and there is a need for more secure biometric based authentication systems.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
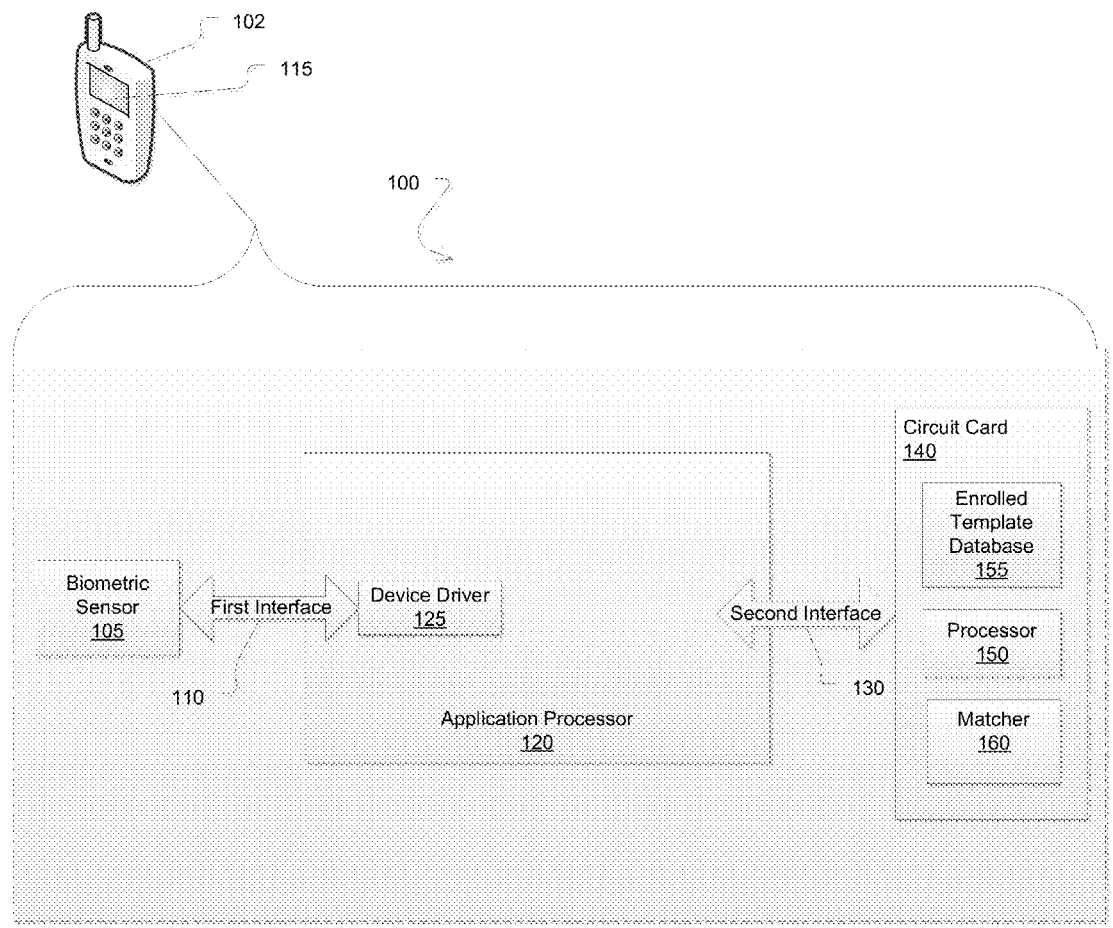
FIG. 1 is a block diagram of an exemplary authentication system.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

Described herein is an exemplary system configured to authenticate a user via a biometric input of the user such as a fingerprint, voice sample, iris scan, etc. In one illustrated approach, the authentication may permit the user to access certain applications within an electronic device. Once received, the biometric input may be translated into a received biometric template and transmitted to a removable secure element. The secure element may be secure, meaning information within the secure element may not be extracted therefrom by an unauthorized user. The secure element may include a matcher configured to compare the received biometric template with enrolled templates within the secure element. Because the matching and authentication are done by the card processor of the secure element, the system provides more security and transferability over other systems.

Moreover, a specific biometric input such as a specific fingerprint may be associated with a specific application within the electronic device, e.g., an email application, map application, general access to the device, etc. This creates a shortcut for the user during authentication. For example, upon scanning and authenticating a user's index finger, an email application may automatically open on the electronic device. In another example, upon scanning and authenticating a user's thumb, a map application may automatically open. Thus, although any of the biometric information for a particular user may be sufficient to provide authorization, different programs may be automatically activated dependent on the biometric input used for the authorization.

FIG. 1 is an exemplary system 100 including a biometric sensor 105, application processor 120 and secure element 140. The system 100 may be included in any electronic device 102 such as a computing or mobile device including but not limited to a cellular phone, smart phone, tablet computer, laptop computer, e-reader, personal computer, MP3 device, etc. The electronic device 102 may include various applications. These applications may include device applications installed on the device such as email, cameras, games, photos, maps, calendars, contact lists, etc. The electronic device 102 may also have a user interface 115 such as a graphical user interface (GUI). The biometric sensor 105 may be in communication with the application processor 120 via a first interface 110. The application processor 120 may also be in communication with a secure element 140 via another, second interface 130.

The biometric sensor 105 may be accessible to a user at the electronic device and may be configured to collect biometric inputs from such a user. In one example, the sensor 105 may be a fingerprint sensor or scanner configured to scan at least one fingerprint of the user. In another example, the sensor 105 may include, but is not limited to, a voice recorder or a retina scanner. For exemplary purposes only, the biometric device is discussed herein as including a fingerprint scanner. The biometric sensor 105 may be integrated within the device, or it may be an add-on sensor configured to communicate with the device via a serial port (e.g., a Universal Serial Bus (USB) port).

The biometric sensor 105 may be in communication with the application processor 120 of the electronic device 102 via the first secure interface 110. The application processor 120 may provide processing capabilities to the system 100. The application processor 120 may facilitate authentication processes as described herein. An exemplary application processor 120 may be a Qualcomm Snapdragon, or any other mobile application processor 120.

The secure interfaces 110, 130, as shown in FIG. 1, may facilitate communication between the biometric sensor 105, application processor 120 and secure element 140. The secure interfaces 110, 130 may include an input/output system configured to transmit and receive data from the respective components. For example, the biometric device may be coupled to the application processor 120 via the first secure interface 110. The first secure interface 110 may facilitate the transfer of biometric data from the biometric sensor 105 to the application processor 120. The secure interfaces 110, 130 may be one-directional. In such a configuration data may only be transmitted in one-direction only. For example, the first secure interface 110 may be a uni-directional interface and data may be transmitted from the biometric sensor 105 to the application processor 120, but not vice versa. The application processor 120 may recognize the biometric sensor 105 and may receive inputs from the sensor 105, but may not transmit information or data to it. Certain output ports at the application processor 120 may be locked, preventing any data to be transmitted to the biometric sensor. Alternatively, the secure interfaces 110, 130 may be bi-directional, both receiving and transmitting data between the application processor 120 and the secure element 140. For example, data may be transmitted and received via the interface 130 between the application processor 120 and the secure element 140. In other examples, one of the secure interfaces 110, 130 may be uni-directional while the other of the secure interfaces 110, 130 may be bi-directional.

Each of the secure interfaces 110, 130 may include security features and be considered a trusted entity. More specifically, in one exemplary approach the secure interfaces 110, 130 may include a Trusted Execution Technology (TXT), which may allow for secure key generation, storage and authentication. The first secure interface 110 may use the TXT to secure the path between the biometric sensor 105 and the application processor 120, while the second secure interface 130 may use the TXT to secure the path between the application processor 120 and the secure element 140. By securing these paths, an enhanced system is provided to protect against the transmission of copied biometric inputs, which could lead to a false positive match. Other security mechanisms may also be implemented. In one example, timestamps may be generated with the biometric input. Thus, when the application processor 120 receives the input, the timestamp may be verified to assure that the input is a true biometric sample and not one that was copied. In this example, the timestamp of a copied input would not reflect a recent time and may include a timestamp that occurred hours, or days, before. Moreover, in response to determining that the time-stamp is "stale," certain input/output ports between the biometric sensor 105 and the application processor 120 could be locked, forcing any incoming inputs to be transmitted through an unlocked port subject to the TXT security measures. Additionally or alternatively, the sensor 105 itself may be configured to transmit a unique identifier with the received biometric input.

A device driver 125 may be included in the application processor 120 and may control and facilitate communication of the biometric inputs collected at the biometric sensor 105 to the application processor 120. It may facilitate the sending of the received biometric inputs to the application processor 120. It may also be responsible for converting or translating the biometric inputs to usable data, such as biometric templates. Additionally or alternatively, the sensor 105 and the application processor 120 may also convert the inputs into templates.

As explained, the biometric inputs may be fingerprints, voice samples, retina scans, etc. If the biometric input is a fingerprint, the device driver 125 and/or the application processor 120 may process and evaluate the image of the fingerprint. Each fingerprint is unique from all others. Certain minutia of the fingerprint may be identified by the application processor 120 or the biometric sensor 105 by identifying certain data points within the fingerprint. For example, a plurality of data points recognized in the fingerprint may indicate that one fingerprint has an arch in its center, while another fingerprint may include a double loop. This minutia may be translated into a vector of numbers, which make up the biometric template. Thus, the biometric template is a numerical representation of the distinct features of the received fingerprint. A user may have multiple biometrics. Each user may have ten different and distinct fingerprints. Each fingerprint would be represented by a unique template. For example, a user's index finger may have one template, while a user's thumb would have another template.

The biometric template may be represented and transmitted in a standard format such as Biometric Interworking Protocol (BIP). A Biometric Identification Record (BIR) may include a header, biometric data and a signature. The BIR may permit the biometric templates to be used across multiple systems. Thus, if the secure element 140 is removed from the electronic device 102 and used in another device, the biometric templates within the secure element 140 may be recognized.

Biometric inputs may be read by the application processor 120 in one of two modes. An enrollment mode may be entered upon powering up an electronic device 102 for the first time. Via the user interface 115, the user may be prompted to enter at least one initial biometric input via the biometric sensor 105. This biometric input may be converted to a biometric template by extracting data points from the biometric input as described above. This template may be stored in an enrolled template database 155 within the secure element 140 as described below. This enrolled template may be one of many templates used to identify a user at a later time for authentication purposes. The enrollment mode may be implemented any time a user wishes to save another biometric input. As explained herein, each application may be associated with a specific biometric input. For example, a user's index finger may authenticate a user, allowing the user to have general access to the electronic device 102 and all its applications. Additionally or alternatively, a user's thumb may be associated with an email application. Thus, the user may customize the associations between the specific biometrics and specific apps within the enrollment mode. Security may be maintained during the enrollment mode. Before establishing new associations between biometric inputs and device application, the user may first be required to enter at least the initial biometric input. The user may also be prompted to enter a password and/or user identification number for further authentication.

An identification mode may also be implemented when a user wishes to access an application within the electronic device 102. An application may include general access to the electronic device 102, or a specific application such as email, photos, maps, etc. In order to gain access to an application, the user may first be authenticated. This may be done by receiving a biometric input from the user. The user may use the biometric sensor 105 to scan one of the user's fingerprints. This biometric input may then be converted to a received biometric data template and compared with the enrolled templates in the enrolled template database 155. If a match is found, then the user may be granted access to one or multiple applications. The identification mode is discussed in detailed below with respect to FIGS. 3 and 4.

A secure element 140 may be in communication with the application processor 120 via the second secure interface 130. The secure element 140 may be a Universal Integrated Circuit card (UICC), or a Subscriber Identity Module Card (SIM card). The secure element 140 may be removably located within the mobile device. Thus, the secure element 140 may be selectively separated from the device 102 and relocated to another electronic device 102. Authentication may be required before any data may be retrieved from the secure element 140. The secure element 140 may store data such as user preferences, phone books, calendars, etc. Thus, when and if the secure element 140 is removed and placed in a second electronic device, the data may then be used by that electronic device. The secure element 140 may also include the enrolled template database 155. Upon removing the card, the enrolled templates may also be relocated to another device. Thus, performing an initial set-up within the enrollment mode when changing electronic devices may not be necessary. The secure element 140 may also be integral to the device 102 and therefore not separable. Because the secure element 140 is certified secure, if the device is stolen, the information within the secure element 140 may remain unavailable to the unauthorized user.

The secure element 140 may include a card processor 150. The card processor 150, similar to the application processor 120, may provide processing capabilities to the secure element 140 and system 100. For example, the card processor 150 may be configured to facilitate authentication. Because the card processor 150 has increased processing capabilities, it may not be necessary to rely on the application processor 120, or another external processor, for authentication. Authentication processes were traditionally saved for the application processor. Information from the secure element would be transmitted to the application processor for processing and authentication would take place within the application processor 120 as opposed to the card processor 150. This would require data, such as authentication data to be either located within, or transmitted to the application processor, which is traditionally, not as secure as the secure element 140. Now, however, with the increase in processing capabilities, the secure element 140 is capable of performing necessary authentication processes without relying on the application processor. Because the secure element 140 is a secure element, as explained below, the fact that processing may be done within a secure element increases the security of the authentication because the data and authentication within the secure element 140 is more secure than that of the application processor.

The secure element 140 may be certified as being secure and may ensure that all data held in the secure element 140 remain secure. It is extremely difficult, if not impossible, for an unauthorized user to extract data from a secure element. If the secure element 140 were removed from the electronic device 102 by an unauthorized user, the data located within it would not be accessible. For example, the secure element 140 may be safe from any type of hardware tapping by an unauthorized user. Moreover, if the enrolled templates were located within the application processor 120, or some other location other than the secure element 140, a fake template could be sent to the secure element 140 during authentication. For example, if the enrolled templates could be extracted by an unauthorized user, that user could use one of the templates to gain access to an application. However, because the templates are stored within the secure element 140, a false template cannot be sent. Moreover, because the matching is done by the matcher 160 within the secure element 140, as described below, a false match cannot be sent back to the application processor 120. Accordingly, by performing the authentication within the secure element 140, a heightened level of securing may be achieved. Moreover, because the biometric input is represented and stored as a vector representation via a biometric template, it is generally not possible to reconstruct the received biometric input (e.g., the fingerprint) from the biometric template. Thus, even if an unauthorized user gained access to the biometric template, the unauthorized user would simply have a list of numbers that correspond to certain data points of the fingerprint. The unauthorized user could not use the vectors to reconstruct the fingerprints the template represents.

In addition to the security benefits of the secure element 140 performing the authentication, the secure element 140 has another advantage in that it is removable. As explained, by enabling the device to be removable, a user may insert the device in another device, thereby carrying the information within the secure element 140 with him or her. The new device may then use the information within the secure element 140 for authentication purposes without the user needing to perform additional or new enrollment within the enrollment mode. Additionally, if the secure element 140 were removed by an unauthorized user, because the secure element 140 is secure, the information within the secure element 140 cannot be accessed by the unauthorized user. Under some circumstances an authorized user may also wish to physically separate secure element 140 from electronic device 102 and store it in a separate location when not using it so as to provide yet another level of security independent from the characteristics of the interface 130.

As noted above, the secure element 140 may include an enrolled template database 155 and a matcher 160. The enrolled template database 155 may be configured to store biometric templates corresponding to one or more specific biometrics of one or more users. The enrolled templates may be received from the application processor 120 via the second secure interface 130 during the enrollment mode. The templates may be transferred via a Biometric Interworking Protocol (BIP) as explained above. The Biometric Identification Record (BIR) may include the enrolled template. The BIR may also include other data, such as a timestamp, sensor identification, header information, etc. At least a portion of this data may be used to further authenticate the template. For example, the secure element 140, upon receiving the BIR, may verify that the timestamp is within a predetermined range, such as within 0.5 seconds of the current time. This may help ensure that the template is one coming from the biometric sensor 105 via the application processor 120 and not a template that was copied or spoofed. Moreover, the secure interfaces 110, 130 may be trusted by the secure element 140. This may be achieved by the TXT, as described above.

Figure 2:
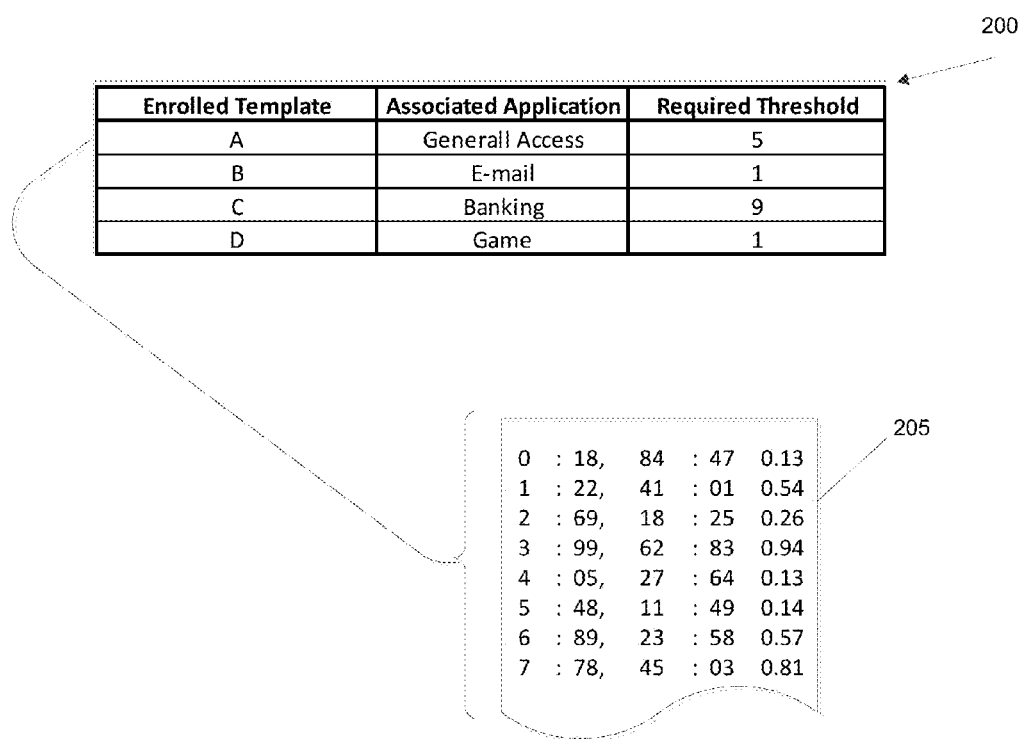
FIG. 2 is an exemplary table of the authentication system.

The enrolled template database 155 may include fingerprint data of a first user and a second user represented by the enrolled biometric templates. The enrolled template database 155 may associate each template with its respective user, as well as a specific application within the electronic device 102. An exemplary table 200 identifying specific biometric templates and their associated applications is shown in FIG. 2, which is discussed in more detail below.

The secure element 140 may also include a matcher 160. The matcher 160 may be configured to compare the received biometric templates with the enrolled biometric templates. The matcher 160 may be implemented by the card processor 150 within the secure element 140. Thus, the matcher 160 is included in the secure element 140 and therefore has increased security over that of a matcher 160 located elsewhere (e.g., the application processor 120). The matcher 160 may receive biometric templates from the biometric sensor 105 via the secure interfaces 110, 130. It may then compare the received biometric template with the enrolled biometric templates. While the match process is described in more detail below, in general, the matcher 160 may then return a status indicator based on the match. For example, the matcher 160 may determine whether a received biometric template matches at least one enrolled template. If a match is not identified, then the matcher 160 may return a 'fail' status to the application processor 120 via the interface 130. If a match is identified, then the matcher 160 may return a 'pass' status to the application processor 120.

The matcher 160 may also recognize different gradients of matches and may return a match score based on the comparison. Some received biometric data may be of lower quality than others. In one example, a fingerprint scanned by the biometric sensor 105 may not be fully readable by the sensor 105. In this case, while the matcher 160 may identify a match, the match may be based on only a fraction of the data representing the fingerprint. A match score may be returned to the application processor 120 to reflect this. On an exemplary scale of 1 to 10, the poor data, as described above, may cause the matcher 160 to return a match score of 3. Had the biometric data included a better sample, a match score of 8 may have been received. This process is described in more detail below.

Additionally or alternatively, the matcher 160 may also be included in the application processor 120. In this exemplary embodiment, the enrolled templates may still be stored in the database 155 of the secure element 140. Thus, the enrolled templates are secure and cannot be duplicated by an unauthorized user. Upon receiving a received template, the matcher 160 may query the database 155 for the enrolled templates and compare the received template with the enrolled templates within the application processor 120.

FIG. 2 shows an exemplary table 200 that may be included in the enrolled template database. The table 200 may include a list of enrolled templates, indicated by A, B, C and D in the table 200. The enrolled templates, as described above, may include a vector representation of a biometric input. A portion of a sample enrolled template is shown in the exploded view at 205. Each template A, B, C and D may represent a specific input. These inputs may identify a specific biometric of a specific user. For example, template A may identify an index finger of a first user. Template B may represent a thumb of the first user. Templates C and D may represent an index finger of a second and third user, respectively. In operation, the first user may be a parent, or the owner of a device. The second and third users may be children or other family members of the first user. Thus, different users may have different authorization requirements with respect to specific applications within the device. For example, children may only have access to certain games or media on an electronic device 102, while parents may have access to all applications. Upon a scan of a child's biometric, access may be granted as to a game, but be denied as to an email application. These settings may be established during the enrollment mode.

By associating each enrolled template with a specific application, an input associated with a specific enrolled template may automatically request access to the associated application. For example, a user's index finger may be associated with general access, while a user's thumb may be associated with an email application. This process is described in more detail below with respect to FIG. 4. Moreover, a user may first request access to a specific application and then be prompted to input his or her biometric input via the biometric sensor 105 in response to the request. In this example, it may be irrelevant if a specific application is associated with the specific input given by the user. Instead, as along as the matcher 160 matches at least one of the enrolled templates with the received template, access to that application may be granted. This process is described in more detailed with respect to FIG. 3.

In addition to associating a specific enrolled template with an application, access may be limited to the applications based on the received biometric template. For example, if a user uses his or her thumb to gain access to an email application, and the user then attempts to navigate to another application within the device 102, e.g., a banking application, access to that application may be denied. On the same note, if a user wishes to open a banking application while he or she is accessing his or her email, the user may enter the biometric input associated with the banking application. For example, access to the banking application may be granted and the application may automatically launch upon the scanning of the user's ring finger, to access the banking application. Thus, the user may be able to move from application to application within the device 104 by simply entering different biometrics and without actually selecting the application.

A user may modify, change, add, and delete associations within the table 200 at any time. During set-up, a user may enroll his or her index finger and associate the index finger biometric with general access to the electronic device 102. As the user uses his or her device, and becomes more familiar with it, the user may then enroll additional templates. The user may wish to associate his or her thumb with a game application, etc. Further, a user may grant access to additional users, such as family members. These family members may have limited access to the applications within the device 102. Children, for example, may only be authorized to access certain game or media applications. For example, a fingerprint of a child may be used to authenticate that child with respect to a game. The user may change these settings at any time. As the child gets older, the child may be authorized to access other applications, such as media applications (e.g., Netflix, YouTube, etc.). Moreover, additional user authentications may be added and removed at any time.

Even further, the user may define certain groups within the table 200. Although not shown, certain biometric inputs may be associated with a specific group. These groups may be one of family members, co-workers, etc. The groups may also include like-individuals such as children or adults within the family. Each group may be associated with a predefined authentication setting, giving that group access to at least one application within the device 102. Any individual identified within that group, may have access to the respective application. If a user is identified as a child, then the user may, upon authentication via the user's biometrics, be granted access to a game application. A user identified as an adult, may be authorized to access more of the applications within the device 102, such as email and banking applications. Thus, users may be granted access either as part of a group, or on an individual basis.

Modifications to the enrolled templates and their associated applications, as well as the development of group settings, may be made via the user interface 115. Displays similar to the table 200 may facilitate the enrollment of these settings. Moreover, prompts provided at the user interface 115 and the biometric sensor 105 may also facilitate enrollment. The user interface 115 may be configured to provide prompts such as "Scan Fingerprint" and "Select application to associate with inputted biometric." These prompts may facilitate execution of the enrollment mode.

As explained, each enrolled template may be associated with a specific application. These applications may include general access to an electronic device 102, email applications, map applications, specific games, online photo sharing applications, etc. Further, each application may be associated with a certain threshold value. The threshold value may indicate a quality of match that must exist before access to the associated application may be granted. For example, a banking application may require a higher threshold than a game application. The threshold may relate to the quality of the match, meaning that a certain percentage of the received biometric data template matches that of an enrolled biometric data template. The threshold may be defined by the application, or may be defined by the user during the enrollment mode.

Figure 3:
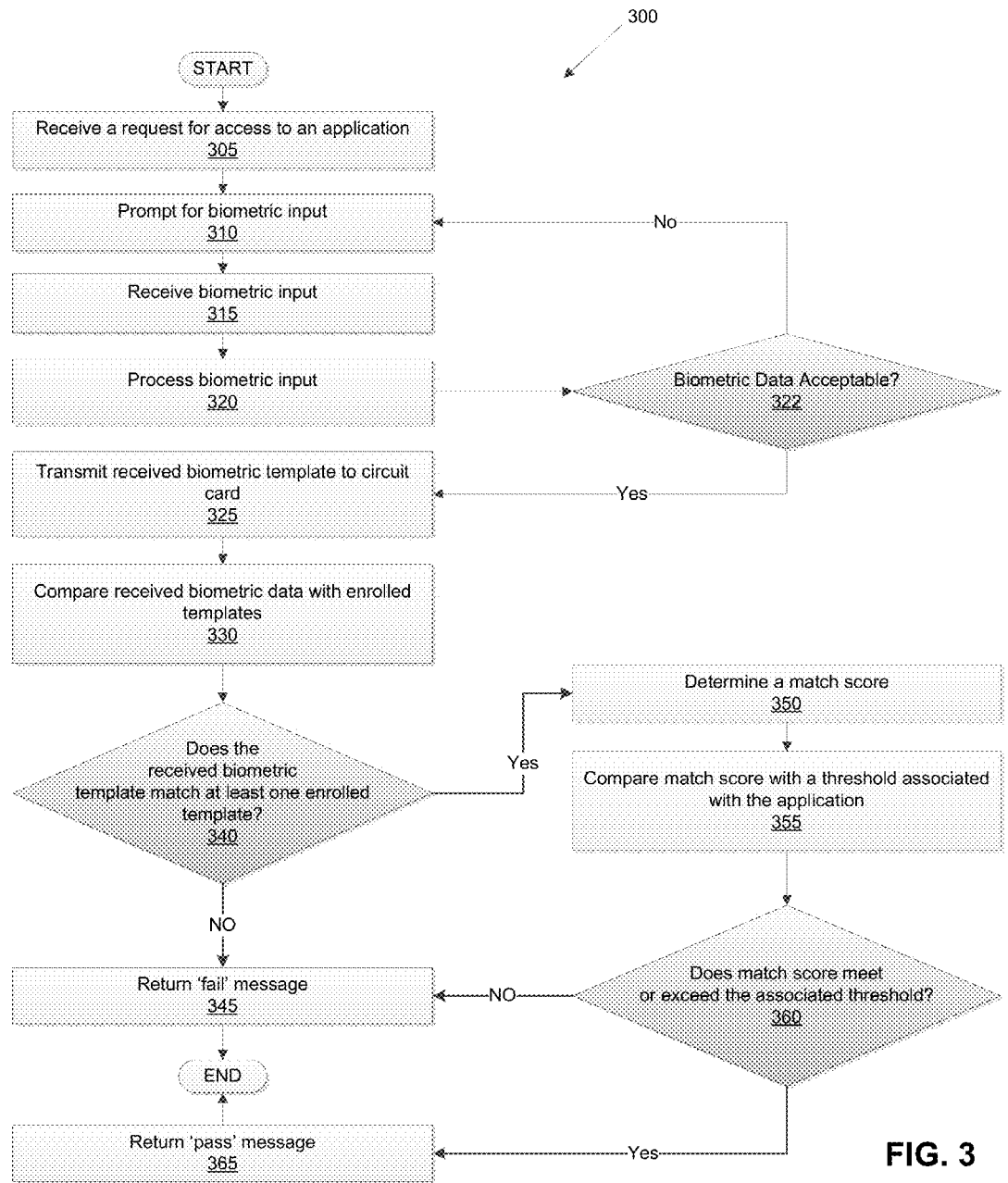
FIG. 3 is an exemplary process for the exemplary authentication system.

FIG. 3 shows an illustrative process for authenticating a user in response to a request to access an application. The process begins at block 305 where a request is made by the user to access an application. The request may be received at the electronic device 102 and be made by the user via the user interface 115. For example, the user may select a specific application such as an email application or map application. The application may also include request to access the electronic device 102. For example, upon turning the electronic device 102 on, or before accessing an application, the user may first need to be authenticated. Once a request for access for an application has been made, the process proceeds to block 310.

In block 310, the application processor 120 may be configured to instruct the user interface 115 to display a prompt for biometric input. For example, the user interface 115 may display a message to the user such as "Scan Finger Now." The process proceeds to block 315.

In block 315, the biometric input, such as a fingerprint, may be received at the biometric sensor 105. The input may also be one of a voice sample or an iris scan. Once the biometric input is received, the process proceeds to block 320.

In block 320, the biometric input is processed by the device driver 125. As explained above, the input may also be processed by the biometric sensor 105 or another application in the application processor 120. The device driver 125 may read the biometric input and identify specific minutia within the input. For example, certain data points identified in a fingerprint may collectively show a feature unique to that fingerprint. This minutia is translated into a vector of number, as shown by way of example at 205 in FIG. 2, or some other data representation, such as a combination of letters and number in a character string, so as to give that fingerprint a unique data representation. The biometric input may be represented in a received biometric template.

Once the biometric input has been processed, the process proceeds to block 322.

In block 322, it is determined whether the biometric data is acceptable. In processing the biometric input, the device driver 125 or application processor may recognize that the biometric input does not identify enough data points to accurately convey a unique data representation via the received biometric template. In other words, the biometric data is erroneous, unclear, not complete, etc. For example, perhaps in scanning the fingerprint the user inadvertently only scanned part of the fingerprint. In another example, dirt, oil, or another substance may obstruct the biometric sensor 105 and cause it to give a partial reading. If the input is considered unacceptable, the process may proceed to block 310 where the device driver 125 may indicate that the biometric input is incomplete and may instruct the application processor 120 to indicate this fact to the user via the user interface 115. The user interface 115 may display a "Please Re-scan" message. While this determination may be made by the device driver 125, it may also be made by the application processor 120 or the secure element 140. If the biometric input is acceptable, the process proceeds to block 325.

In block 325, the received biometric template is transmitted to the secure element 140 via the second secure interface 130. The template may be transmitted to the matcher 160 within the secure element 140. The process proceeds to block 330.

In block 330, the matcher 160 of the secure element 140 may compare the received biometric template with the enrolled biometric templates stored in the enrolled template database 155. The matcher 160 may compare within the received template with each enrolled template until a match is identified or until there are no more enrolled templates to compare the received template with. The process proceeds to block 340.

In block 340, the matcher 160 determines whether the received biometric data matches at least a portion of at least one of the enrolled biometric templates. As explained above with respect to the table 200 in FIG. 2, it may be irrelevant whether a match enrolled template is associated with the same application in FIG. 2 as the application that was requested in block 305. The matcher 160 may only be concerned if a match was made and not with whether the appropriate application was requested in view of that match. Alternatively, this additional step may be included and if the requested application does not match the template associated with the same application, a match may not be identified. If a match is not identified, the process proceeds to block 345. If a match has been identified, the process proceeds to block 350.

In block 345, the matcher 160 has failed to identify a match with the received biometric template. The matcher 160 may return a match status having a "fail" status to the application processor 120, which may in turn deny the request for access to the application. Upon receiving a fail message from the matcher 160, the application processor 120 may instruct the user interface 115 to alert the user as to the failure. For example, the user interface 115 may display an "Access Denied" message.

The matcher 160 may maintain a record of the number of attempted inputs presented for a given access request. Based on this number of failed attempted inputs, the matcher 160 may be configured to transmit a message to the application processor 120 instructing it to lock the device. For example, if five sequential failed attempts to access the device 102 have been logged at the matcher 160, the application processor 120 may refuse to send any additional received templates to the secure element 140 for at least a predetermined amount of time. Thus, if an unauthorized user is attempting to access the device 140 by presenting multiple biometric inputs, the device may lock up, preventing any more inputs from being processed by the matcher 160. Further, in the event that the system detects an unusually high amount of failed access attempts, a message may be sent to the user of the device. Such message may be sent via an email message, text message, etc. Additionally or alternatively, the message may be sent to another device such as a telephone device, either a mobile device or one connected to a land line, in an effort to further alert the user of the failed access attempts.

In block 350, once a match has been identified, the matcher 160 may determine the quality of the match by associating the match with a match score. The match score, as explained and for exemplary purposes only, may include a numeric value from 0-10. The match score may identify how well the received biometric template matched the enrolled biometric template. For example, if only a portion of the vectors within the templates matched each other, a match score of 3 may be returned. If nearly all of the vectors within the templates match, then a match score of 10 may be returned. Once a match score has been identified, the process proceeds to block 360.

In block 355, the match score is compared with the threshold value associated with the application for which access was requested for. For example, in referring to FIG. 2, if a user requested access to a banking application, then the corresponding threshold value is 9. Once the match score has been compared with the associated threshold value, the process proceeds to block 360.

In block 360, the matcher 160 determines whether the match score exceeds or at least matches the threshold value. If so, the process proceeds to block 365. If not, the process proceeds to block 345. In block 345, as described above, the matcher 160 may return a fail message to the application processor 120. While the matcher 160 may have identified a match between the received biometric template and an enrolled template, the match quality, as reflected by the match score, may not meet the standards for that specific application and therefore authentication and access to that application cannot be granted.

In block 365, the matcher 160 has determined that the match score meets or exceeds the threshold value for the requested application and therefore returns match status having a "pass" status to the application processor 120. The application processor 120 may then grant access to the application by opening that application for the user. The application may be opened automatically, without further user input. Additionally or alternatively, the user interface 115 may indicate to the user that access has been granted via an "Approved" message or "Access Granted" message.

Figure 4:
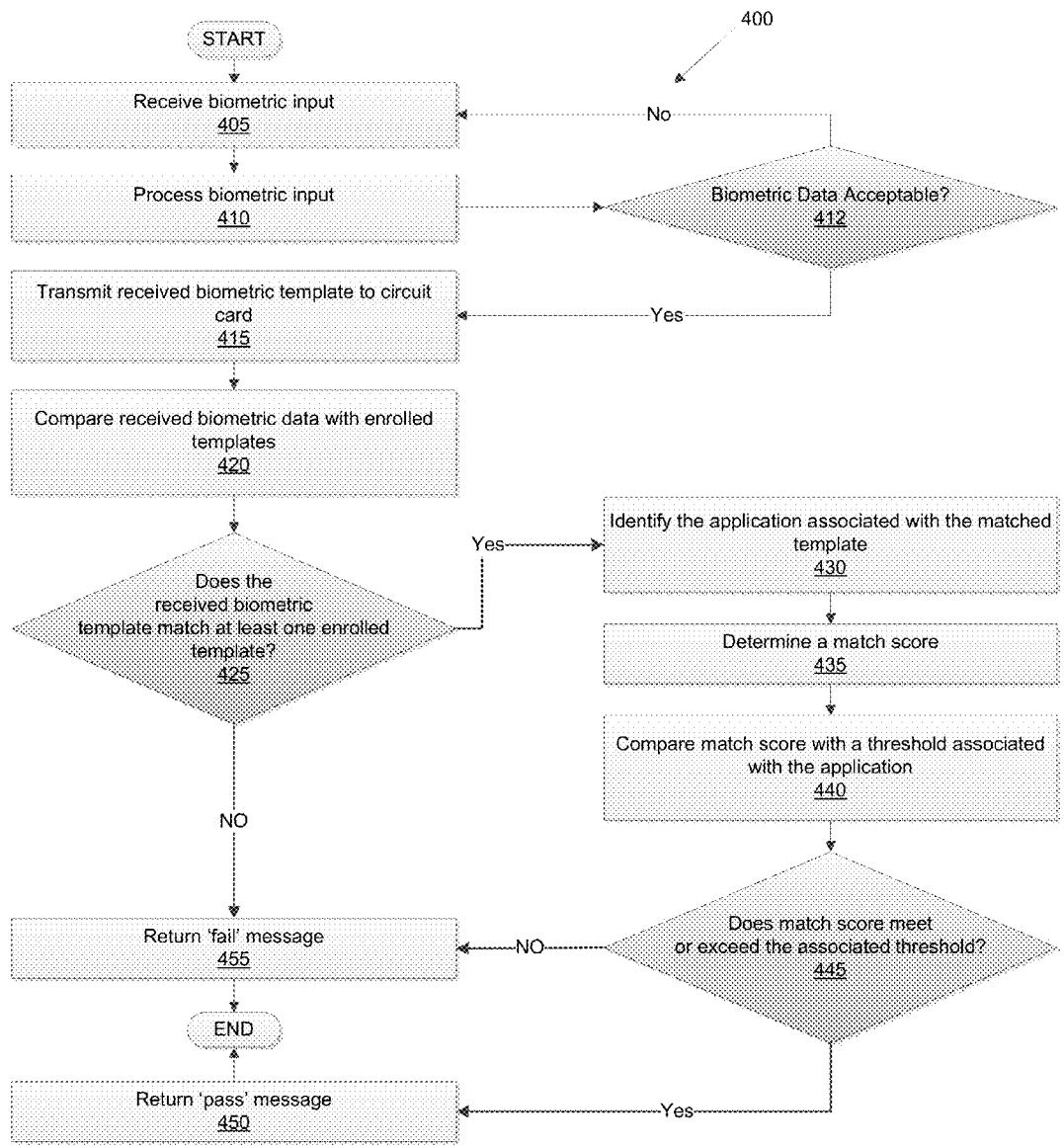
FIG. 4 is another exemplary process for the exemplary authentication system.

FIG. 4 shows an exemplary process similar to that of FIG. 3. However, in FIG. 4, the process begins at block 405 upon receipt of a biometric input. Instead of a user requesting access to a specific application and then inputting his or her biometrics, the request in this example, accompanies the biometric input. For example, the biometric input itself may identify and be associated with a specific application. In one instance, a swipe of a user's index finger may indicate that access to an email application has been requested. Thus, by associating a specific biometric input with an application, a shortcut may be associated with the biometric input and the process may eliminate the step of first identifying the application, such as step 305. As explained above, these associations may be identified in the exemplary table 200 shown in FIG. 2.

In block 410, the device driver 125 may process the biometric input as describe with respect to block 320 above. In block 412, it is determined whether the biometric data is acceptable, similar to block 322. If the input is considered unacceptable, the process may proceed to block 405 where the device driver 125 may indicate that the biometric input is incomplete and may instruct the application processor 120 to indicate this fact to the user via the user interface 115, similar to block 310 described above. Additionally or alternatively, a prompt may not be shown to the user. The user may realize, when the application does not open, that the fingerprint scan was incomplete and re-scan the biometric at this time. If the biometric input is acceptable, the process proceeds to block 415.

At block 415, where the biometric template generated from the biometric input is transmitted to the secure element 140, similar to block 325. The process proceeds to block 420, where the received biometric data is compared with the enrolled templates, similar to block 330. The process proceeds to block 425, where the matcher 160 determines whether the received biometric data matches as least a portion of at least one enrolled template. Similar to block 340, if no match is identified, the process proceeds to block 455 where a fail status is returned to the application processor 120.

If at least one match is identified, the process proceeds to block 430. Differing from process 300, block 430 identifies an application associated with the matched template. For example, referring to table 200 in FIG. 2, if the received biometric template matches enrolled template B, the associated application is an email application. By using the matched template to identify the application, the user does not need to request access to that specific application. Instead, the biometric input is used to identify the application that the user wishes to access. These associated applications, as explained above, may be established by the user during the enrollment mode. Once the application has been identified, the process proceeds to block 435.

In block 435, similar to block 350, a match score is identified. The process proceeds to block 440, where the match score is compared with the threshold value associated with the application, as described above with respect to block 355. The process proceeds to block 445. In block 445, if the match score meets or exceeds the threshold value, the process proceeds to block 450, similar to block 360. If the match score does not meet or exceed the threshold value, the process proceeds to block 455.

In block 450, similar to block 365, a pass status may be returned to the application processor 120 via the second secure interface 130.

While the above methods are described with respect to biometric authentication, additional authentication methods may be implemented. For example, in addition to the biometric authentication, a user may also be further authenticated by a password and/or user identification number. The user interface 115 may prompt the user for such information. This information may also be verified via the secure element 140. In one example, a password may be associated with a biometric input within the enrolled template database. Upon a match of the received biometric template, a user may also be required to enter a password. This password may be verified against the one associated with the received biometric input within the enrolled template.

For further security, any data sent via the secure interfaces 110, 130 may be encrypted. Both the application processor 120 and the secure element 140 may share a key upon initialization (e.g., upon insertion of the secure element 140 into the device 102). This key may be used to encrypt and decrypt data sent between the biometric sensor 105, application processor 110 and secure element 140. For example, when a received biometric template is transmitted from the application processor 120 to the secure element 140, the template may be encrypted with the key. The secure element may then use that key to decrypt the template. Thus, if a copied or spoofed template is transmitted to the secure element 140, the template may not be encrypted with respect to the shared key and therefor, decryption at the secure element 140 may result in an erroneous data set.

Accordingly, a secure authentication system is provided to avoid unauthorized access to electronic device 102 applications by processing biometric authentication within a removable secure element. Further specific biometrics may be associated with specific applications and used as shortcuts for launching those applications. Upon removal of the secure element, the data included therein may be transferred to another device without requiring the use to re-enroll, while maintaining the data securely within the secure element.

Moreover, in other embodiments, specific combinations and orderings among the biometric input of a particular combination may be used to automatically activate different programs. In any case, a notification of the automatic activation may be provided to the user via the mobile device (and delay prior to initiation), thereby allowing such functionality to be circumvented through user input cancelling the activation. Upon receiving the first acceptable biometric input of a combination of biometric inputs a list of applications that are able to be automatically initiated using the first biometric input may be provided, with the applications in the list being revised (e.g., decreased) as additional acceptable biometric inputs are provided.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed as new and desired to be protected by Letters Patent of the United States is:

1. A system comprising:
    an input device configured to receive a user biometric input;
    an application processor configured to communicate with the input device, verify a timestamp of the user biometric input by determining whether the timestamp indicates a recent time that is within a predetermined range, and translate the user biometric input into a received template including a vector representation of the user biometric input, the application processor comprising part of a mobile computing device;
    a secure element configured to be in selective communication with the application processor and to receive the received template from the application processor, the secure element including a matcher and an enrolled template database, the secure element comprising a user-associated integrated circuit card physically removable from the mobile computing device; and
    wherein the matcher is configured to
        compare the received template from the application processor with at least one enrolled template within the enrolled template database,
        identify a match score indicating a fraction of the vector representation of the received template that matches the at least one enrolled template, and
        return a match status based on the comparison to the application processor.

2. The system of claim 1, wherein the secure element comprises one of a Universal Integrated Circuit Card (UICC) or a Subscriber Identity Module (SIM) card.

3. The system of claim 1, wherein the matcher is further configured to determine a match within the secure element in response to the received template matching the at least one enrolled template.

4. The system of claim 3, wherein the matcher is further configured to associate at least one application type with the matched enrolled template.

5. The system of claim 4, wherein the matcher is further configured to send a message to the application processor granting access to the application associated with the matched enrolled template, whereby a match of the received template with the at least one enrolled template automatically opens the associated application.

6. The system of claim 4, wherein at least one of the enrolled templates and the associations with an enrolled template may be established via user input during an enrollment mode.

7. The system of claim 1, wherein the matcher is further configured to:
    associate a threshold value with each enrolled template, wherein the match status is a pass status in response to the match score being greater than the threshold value associated with the matched enrolled template.

8. The system of claim 1, wherein the predetermined range includes at least one of hours and days before.

9. A method, comprising:
    receiving, at a computing device, a user biometric input;
    verifying a timestamp of the user biometric input by determining whether the timestamp indicates a recent time that is within a predetermined range;
    converting, at an application processor comprising part of a mobile computing device, the user biometric input into a received biometric template including a vector representation of the user biometric input;
    transmitting the received biometric template to a secure element, the secure element comprising a user-associated integrated circuit card physically removable from the mobile computing device;
    comparing, at the secure element, the received biometric template with at least one enrolled template;
    identifying a match score indicating a fraction of the vector representation of the received template that matches the at least one enrolled template; and
    transmitting a status based on the comparison to the application processor.

10. The method of claim 9, further comprising:
    identifying at least one match between the received biometric template and the at least one enrolled template; and
    identifying an application associated with the matched enrolled template.

11. The method of claim 10, further comprising:
    identifying at least one threshold value associated with the identified application; and
    determining whether the match score exceeds the associated threshold value, wherein the match status includes a pass status in response to the match score exceeding the associated threshold value and the match status includes a fail status in response to the threshold value exceeding the match score.

12. The method of claim 10, further comprising receiving a request for access to an application and wherein the user biometric input is received in response to prompting a user for the input at the computing device.

13. The method of claim 10, wherein the received template is compared with the at least one enrolled template during an identification mode.

14. The method of claim 9, further comprising storing the enrolled templates within the secure element during an enrollment mode.

15. A non-transitory computer-readable medium tangibly embodying computer-executable instructions comprising:
- receiving, at a computing device, a user biometric input;
- verifying a timestamp of the user biometric input by determining whether the timestamp indicates a recent time that is within a predetermined range;
- converting, at an application processor comprising part of a mobile computing device, the user biometric input into a received biometric template including a vector representation of the user biometric input;
- transmitting the received biometric template to a secure element, the secure element comprising a user-associated integrated circuit card physically removable from the mobile computing device;
- comparing, at the secure element, the received biometric template with at least one enrolled template;
- identifying a match score indicating a fraction of the vector representation of the received template that matches the at least one enrolled template; and
- transmitting a status based on the comparison to the application processor.

16. The medium of claim 15, further comprising:
- identifying at least one match between the received biometric template and the at least one enrolled template; and
- identifying an application associated with the matched enrolled template.

17. The medium of claim 16, further comprising identifying at least one threshold value associated with the identified application.

18. The medium of claim 17, further comprising determining whether the match score exceeds the associated threshold value.

19. The medium of claim 18, wherein the match status includes a pass status in response to the match score exceeding the associated threshold value.

20. The medium of claim 15, further comprising storing the enrolled templates within the secure element.

21. A mobile computing device, comprising:
- an input device configured to receive a user biometric input;
- an application processor configured to communicate with the input device, verify a timestamp of the user biometric input by determining whether the timestamp indicates a recent time that is within a predetermined range, and translate the user biometric input into a received template including a vector representation of the user biometric input;
- an interface configured to:
  - send the received template from the mobile computing device to a user-associated integrated circuit card physically removable from the mobile computing device,
  - identify a match score indicating a fraction of the vector representation of the received template that matches the at least one enrolled template; and
  - receive a match status from the user-associated integrated circuit card based on comparison within the user-associated integrated circuit card of the received template with at least one enrolled template within an enrolled template database.

22. The mobile computing device of claim 21, wherein the user-associated integrated circuit card comprises one of a Universal Integrated Circuit Card (UICC) or a Subscriber Identity Module (SIM) card.

* * * * *